United States Patent [19]

Kohn et al.

[11] Patent Number: 5,265,227
[45] Date of Patent: Nov. 23, 1993

[54] PARALLEL PROTECTION CHECKING IN AN ADDRESS TRANSLATION LOOK-ASIDE BUFFER

[75] Inventors: Leslie D. Kohn, San Jose, Calif.; Shai Rotem, Hoffit, Israel

[73] Assignee: Intel Corporation, Santa Clara, Calif.

[21] Appl. No.: 853,008

[22] Filed: Mar. 17, 1992

Related U.S. Application Data

[63] Continuation of Ser. No. 436,368, Nov. 14, 1989, abandoned.

[51] Int. Cl.[5] .................... G06F 12/10; G06F 12/14
[52] U.S. Cl. ............................. 395/400; 395/425; 364/DIG. 1
[58] Field of Search .................. 395/400, 425

[56] References Cited

U.S. PATENT DOCUMENTS

| | | | |
|---|---|---|---|
| 4,241,401 | 12/1989 | De Ward et al. | 364/200 |
| 4,332,010 | 5/1982 | Messina et al. | 395/425 |
| 4,581,702 | 4/1986 | Saroka et al. | 364/200 |
| 4,589,092 | 5/1986 | Matick | 364/200 |
| 4,638,426 | 1/1987 | Chang et al. | 364/200 |
| 4,641,277 | 2/1987 | Yata et al. | 364/900 |
| 4,775,955 | 10/1988 | Liu | 364/900 |
| 4,809,160 | 2/1989 | Mahon et al. | 364/200 |
| 4,885,680 | 12/1989 | Anthony et al. | 364/200 |
| 4,890,223 | 12/1989 | Cruess et al. | 364/200 |
| 5,008,811 | 4/1991 | Scalzi et al. | 395/400 |
| 5,025,366 | 6/1991 | Baror | 395/425 |
| 5,055,999 | 10/1991 | Frank et al. | 395/425 |

Primary Examiner—Joseph L. Dixon
Assistant Examiner—Michael A. Whitfield
Attorney, Agent, or Firm—Blakely, Sokoloff, Taylor & Zafman

[57] ABSTRACT

A translation look-aside buffer is implemented utilizing a four-way set associative cache memory having four lines of 16 sets each. A virtual address tag and its corresponding physical address tag, as well as a number of status bits which control the type of access permitted for a given virtual address, are stored in the translation look-aside buffer. A portion of the inputted virtual address signal is used to provide a virtual address tag and is compared to the virtual address tag in the buffer memory. When the virtual address tag comparison is achieved, the physical address tags are provided as an output from the translation look-aside buffer. Also at the same time, a fault detection circuit performs various fault detection logic on the status bits, depending on the execution cycle being performed, such as read/write cycle or user/supervisor mode. If a hit occurs with one of the stored virtual address tags, its physical address tag is used, but only if a fault indication does not occur thereby generating a trap. The comparison of the virtual address tags, the generation of the physical address tag and checking of the status bits for fault detection is performed simultaneously in parallel so that only one clock cycle is needed to generate a physical address tag and a fault signal, if any, from the address translation look-aside buffer.

17 Claims, 4 Drawing Sheets

FIG_1 (PRIOR ART)

FIG_2

FIG_3

FIG_4  FORMAT OF A PAGE TABLE ENTRY

FIG_6

FAULT

PARALLEL PROTECTION CHECKING IN AN ADDRESS TRANSLATION LOOK-ASIDE BUFFER

This is a continuation of application Ser. No. 07/436,368, filed Nov. 14, 1989 now abandoned.

BACKGROUND OF THE INVENTION

1. Field of the Invention

The present invention relates to a field of microprocessors and more particularly, to a memory management unit utilizing address translation look-aside buffers.

2. Prior Art

The use of a computer system, having a central processing unit (CPU) and an associated memory for storing instructions and/or data is well known in the prior art. The memory may be comprised of a variety of memory devices, such as a read-only memory (ROM), random-access memory (RAM), and/or disk storage device. Typically, a data bus and an address bus couple the CPU to its associated memory or memories. An addressing signal is provided onto the address bus by the CPU for addressing a location within the memory device. Once the address location has been established, then data is either written into or read from the memory by utilizing the data bus. In some instances, the address and data are multiplexed on the same bus lines. In the simplest of computers, the CPU provides the actual physical address of the memory location which is to be accessed.

However, as requirements for additional memory increased, virtual memory systems were devised to provide more addressable memory than that which is physically addressable by the CPU. In a typical virtual memory system, the processor, such as the CPU, generates a virtual address. Then, some form of a memory management unit/system is utilized to translate the virtual address to the physical address. In one such scheme, blocks of physical memory locations are arranged into pages and these pages are mapped into a table or a directory. The virtual address then selects the proper page by accessing the page map or table and the applicable page selects the physical address in memory corresponding to the virtual address. Various virtual addressing techniques are known in the prior art for accessing not only internal memory but also the external memory, as well as any type of cache memory.

With most virtual address systems, some form of address translation is needed to convert the virtual address to the corresponding physical address. Because such address translation takes a certain finite amount of time to translate the virtual address to the physical address, address translation may limit the speed of the processor in executing a certain instruction. This limitation in speed is noticeable in high-speed microprocessor devices currently being implemented, especially where multiple clock cycles are needed to provide the address translation. Where the microprocessor is on a single integrated circuit chip, the size limitation also becomes a significant constraint.

Additionally, where the microprocessor has the capability of performing multi-tasking (i.e. process multiple number of independent tasks), and wherein such multi-tasking is transparent to the user, it is essential that the processor has the capability of protecting certain areas of memory from unauthorized access. For example, it is undesirable for a certain section of memory being allocated to a first user being accessed by a second user. Some form of protection checking is required in order that a multi-tasking system provides the appropriate protection from improper access. In many instances status bits are used to determine which requested access is proper.

More recently, microprocessors have devised schemes of utilizing cache memory to translate the virtual address to physical address. These cache translators termed address translation units operate to provide a physical address without translation, if the corresponding virtual address is located within the translation unit. These translation units utilize cache memory such that the more recently used addresses are stored in the memory. If the virtual address is not located in the cache memory, then the extended technique of translating the virtual address to its physical address is invoked. Where multi-tasking processors are utilized, the prior art systems typically translate the virtual address, either through the cache or through the extended technique, and then, the access codes are checked to determine if that given physical memory location may be accessed for the operation being executed and/or the user requesting access. However, such serial processing will take longer time, usually multiple clock cycles, to perform.

It is appreciated then that a reduction in the time period for performing such address translation, as well as determining the access right, will reduce the overall time period for executing a given instruction within a microprocessor.

SUMMARY OF THE INVENTION

The present invention describes a translation look-aside buffer which translates a virtual address tag to a physical address tag, while simultaneously checking the status bits to determine access rights to the selected physical address. The translation look-aside buffer receives a virtual address tag and compares the virtual address tag to a plurality of virtual address tags stored in its buffer memory. The translation look-aside buffer is comprised of a four-way set associative cache memory with 16 sets. For each virtual address tag stored in the buffer memory there is a corresponding physical address tag and a number of status bits associated with the physical address tag.

In comparing the inputted virtual address to the stored virtual address tags, a hit will result if a match occurs with one of the stored virtual address tags. Upon a hit the appropriate physical address tag is selected. The status bits appended to the physical address tags are simultaneously checked to determine if access is allowed or prohibited depending on the type of access being requested, such as read-write and/or user/supervisor mode. If the access is permitted, then the physical address tag is a valid access and the physical address tag is combined with the offset bits to address the actual physical location in memory. The process of comparing the virtual address, providing the physical address, and checking the status bits for an access right detection is provided in parallel such that all of these steps are achieved in a single phase of a single clock cycle.

DETAILED DESCRIPTION OF THE PRESENT INVENTION

The present invention describes an apparatus and a method for providing parallel protection checking in a translation look-aside buffer. In the following description, numerous specific details are set forth, such as specific access right protocols, etc., in order to provide a thorough understanding of the present invention. It will be obvious, however, to one skilled in the art that the present invention may be practiced without these specific details. In other instances, well-known circuits and protocols have not been described in detail in order to not unnecessarily obscure the present invention.

Figure 1:
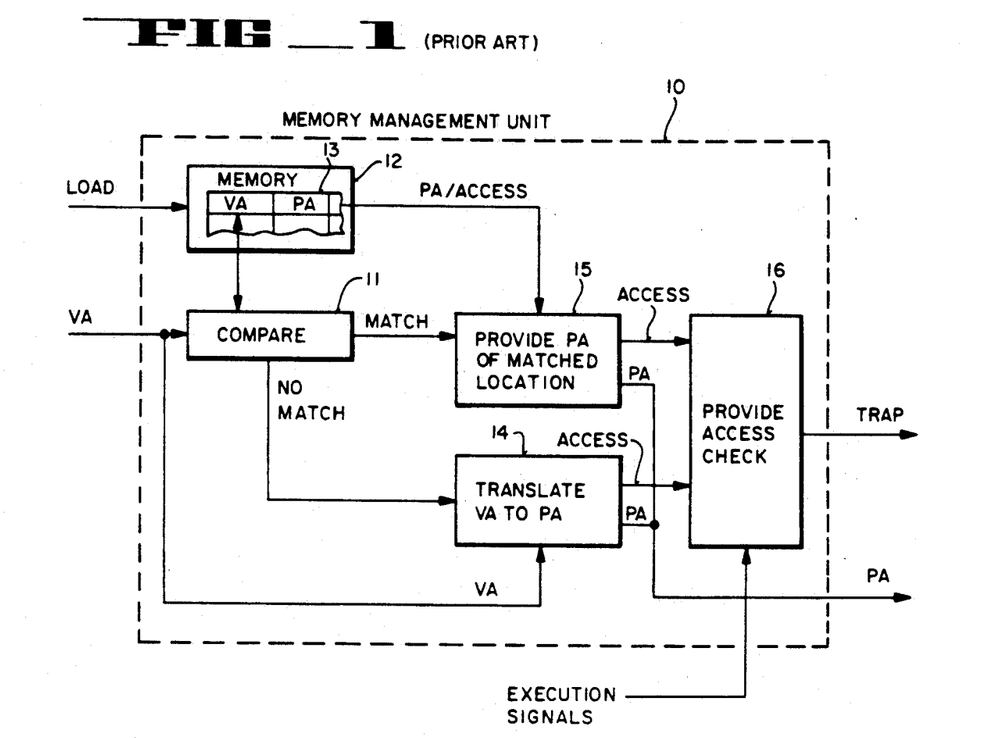
FIG. 1 is a block schematic diagram of a prior art memory management unit.

Referring to FIG. 1, a prior art memory management unit 10 of a processing device is illustrated. Memory management unit (MMU) 10 includes a comparator 11 and memory 12 for converting a virtual address (VA) to a physical address (PA). Memory 12 stores a plurality of words 13, in which each word 13 includes a given virtual address and its corresponding physical address. In most instances, bits for checking the access right for a given physical address is also included in memory 12 and may be part of word 13. As most virtual addressing systems are capable of addressing millions of address locations, and because of the size constraint of memory 12, memory 12 can only store a certain number of words 13. Memory 12 is loaded with a predetermined number of words 13. Words 13 correspond to addresses which are accessed more frequently or were accessed most recently. Typically, memory 12 is a cache memory, wherein it is continually updated to contain address locations of the most recently accessed addresses.

As shown in FIG. 1, comparator 11 and memory 12 function together to provide an equivalent of an address translation look-aside scheme. A virtual address is coupled as an input to comparator 11 at which time comparator 11 compares the virtual address to the virtual addresses stored within words 13 of memory 12. If one of the stored virtual addresses of word 13 matches the inputted virtual address to MMU 10, then there is a hit. Upon a hit, a match signal is generated by comparator 11, wherein selector 15 selects the appropriate word 13 from memory 12 so that the physical address corresponding to the appropriate virtual address of word 13 is selected as the output of selector 15. Typically, access bits for corresponding physical addresses of word 13 are also stored in memory 12. These access bits, corresponding to a selected physical address, are provided to an access checker 16 to generate a trap, if necessary.

In the event a hit does not occur, a no-match signal is generated by comparator 11 and is coupled to translator 14. Upon a miss (no hit) condition, the virtual address input to MMU 10, which is also coupled to translator 14, is processed by translator 14. Translator 14 translates the virtual address to provide the corresponding physical address and this physical address is outputted from translator 14. In most instances, the time required to translate the virtual address to provide the physical address in translator 14 takes a longer time period than the output of the selected physical address from memory 12. This is because memory 12 is typically a RAM having the physical address stored therein, whereas translator 14 requires additional steps to translate the virtual address (that is, the physical address is not readily available). Then, access check is provided to the address output of translator 14.

The physical address output from selector 15 or translator 14 is coupled as an output for accessing a physical location. Various execution signals are typically coupled to access checker 16 for determining appropriate circumstances for permitting or prohibiting certain access rights. When the physical address is provided by selector 15, the corresponding access check bits of the selected physical address are coupled to access checker 16. These bits are compared to the execution signals and if access is not permitted, a trap signal is generated from access checker 16. The trap signal prohibits the physical address signal from accessing the physical location. For example, for a given physical address, the system may permit a given user to read from that physical location, but not permit the same user to write into that physical address location. In this instance, access checker 16, when it receives the access check bits, will check to determine if the operation to be performed is a read or a write, and access is permitted if it is a read operation. However, a trap is generated and the system will not allow the physical address to access the physical location if it is a write operation. In practice, access right bits are appended to the physical address in memory 12 so that the access right information is provided to access checker 16 as an addendum to the physical address stored within word 13. The physical address from selector 15 and the trap signal are generated as an output of MMU 10 much faster than the time it takes to translate the virtual address to the physical address.

It is to be appreciated that in the prior art unit of FIG. 1, a certain finite time period is required to provide the physical address once the virtual address is inputted into the MMU 10 and additional time is needed for the subsequent access right checks, which are to be performed to the generated physical address. That is, it takes one clock cycle (or one phase of a clock cycle in a multiple phase clock cycle) to obtain the proper physical address and another clock phase or cycle to perform the access rights check. Further, it is to be noted that typically the comparison of the virtual address by comparator 11 and the generation of the physical address upon a hit occur faster than the time required to translate the virtual address to the physical address upon a miss condition. Therefore, it is advantageous that memory 12 contain virtual addresses (and corresponding physical addresses and access bits) of the more frequently addressed locations or the more recently addressed locations. Thus, the advantage of using a cache memory for memory 12.

Figure 2:
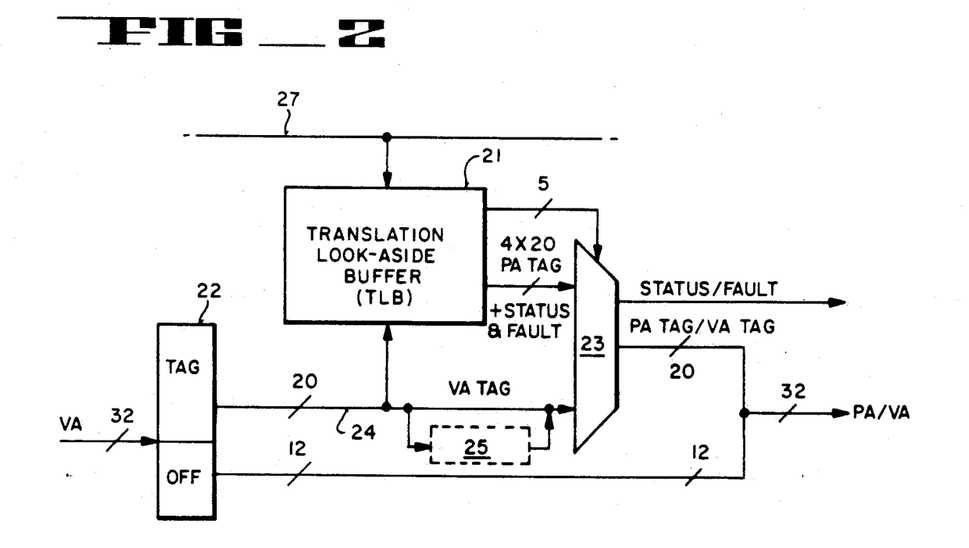
FIG. 2 is a block schematic diagram of a portion of a memory management unit showing a translation look-aside buffer of the present invention.

Referring to FIG. 2, a portion of the memory management unit utilizing the translation look-aside buffer of the present invention is shown. Virtual address (VA) signal as used in the preferred embodiment has a length of 32 bits, wherein the most significant 20 bits are designated as the virtual address tag ($VA_{tag}$), while the lower order 12 bits are designated as the offset bits. It is to be appreciated that the actual number of bits used for the virtual address tag and the offset are arbitrary and is determined as a design choice. Input latch 22 latches in the VA address and the upper 20 bits of the VA address forms the inputted $VA_{tag}$. This $VA_{tag}$ is coupled to the translation look-aside buffer (TLB) 21 and to multiplexer (MUX) 23. TLB 21 implements a four-way set associative cache memory with 16 sets for a total of 64 entries. Each of the four entries stores a given TLB $VA_{tag}$ and its corresponding physical address tag ($PA_{tag}$) and status/access bits. The four-way set associative cache memory is implemented in four random access memory (RAM) arrays, such that each set is accessed simultaneously to determine if a hit condition exists. It is to be appreciated that other memory configurations can be readily used to practice the present invention without departing from the spirit and scope of the present invention.

The $VA_{tag}$ on bus 24 is coupled as an input to TLB 21. Upon receiving the 20 bit $VA_{tag}$, TLB 21 searches for an identical $VA_{tag}$ in the four RAM arrays. If a hit occurs, (that is an identical $VA_{tag}$ is found in the TLB 21), its corresponding $PA_{tag}$ is generated as an output from TLB 21 and as an input to MUX 23 (as will be described below, the access check bits and other status bits are appended to the $PA_{tag}$s and are provided along with the $PA_{tag}$). Five control signals are also generated by TLB 21, wherein one control signal is used to designate a hit condition, while the other four are utilized to select the proper entry having the hit condition. If a miss (no hit) condition occurs, signifying that the $PA_{tag}$ corresponding to the inputted $VA_{tag}$ does not exist in TLB 21, the 20 bit $VA_{tag}$ on bus 24 is passed through MUX 23. Therefore, if a hit condition occurs within TLB 21, MUX 23 generates a 20 bit $PA_{tag}$, which is then combined with the 12 bit offset to generate a 32 bit physical address. If a miss condition occurs, then MUX 23 will pass the 20 bit $VA_{tag}$ which when combined with the 12 bit offset results in the original 32 bit VA address. The VA signal will then be translated to determine its physical address. Upon translation of the VA signal, appropriate $VA_{tag}$ and $PA_{tag}$ information is then loaded into TLB 21 through bus 27 for subsequent access.

In an alternative embodiment a translator 25 is coupled to bus 24, wherein translation of the $VA_{tag}$ commences, while TLB 21 is checking for a hit. The two processes are conducted in parallel. The $PA_{tag}$ from TLB 21 is made available at the output of MUX 23 if there is a hit. If a miss occurs, the translator provides the $PA_{tag}$. Although the two processes are conducted in parallel, TLB 21 provides its output much quicker than translator 25 and this output from TLB 21 is used if a hit occurs. It is to be noted that the present invention uses the scheme using the translation look-aside buffer to provide the physical address tag and the access check bits.

Figure 3:
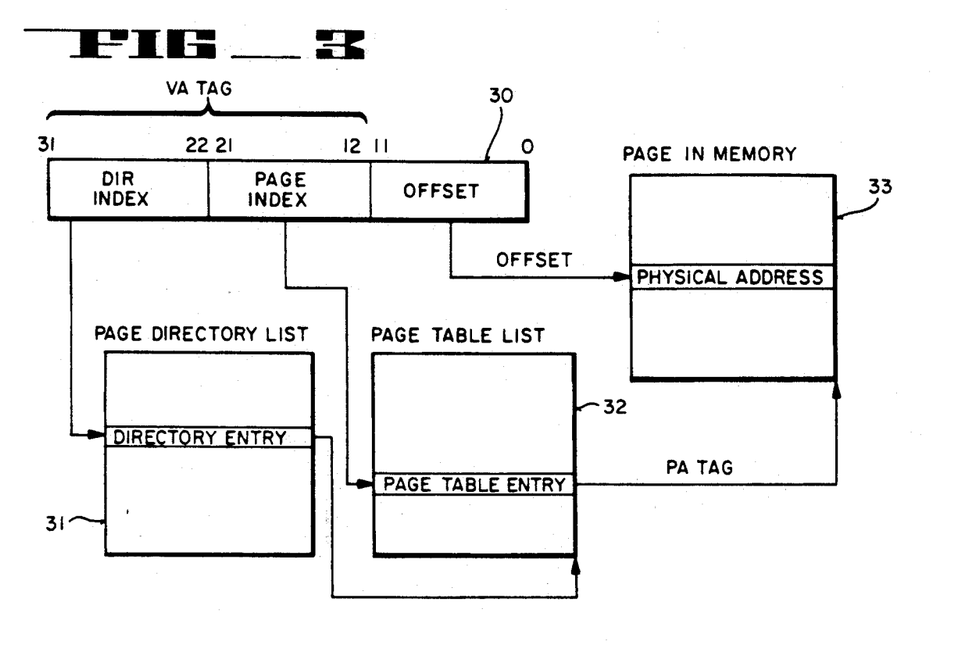
FIG. 3 is an illustration showing an address translation scheme of the present invention.

Referring to FIG. 3, an address translation scheme as used in the present invention is shown. The virtual address is a 32-bit word. The most significant 10 bits are used as a directory index to point to a location within a page directory list 31. The second most significant 10 bits are used as a page index to point to a location within a page table 32. The least significant 12 bits are used as offset bits for pointing to a location within a page 33 in memory.

The page directory list 31 has a number of directory entries wherein the most significant 10 bits of word 30 points to a given entry within page directory list 31. Plurality of page tables 32 are grouped into a single page directory list 31, such that each directory entry points to a location of a given page table list 32.

Then, page index of word 30 points to a given entry within the selected page table list 32. The page table list 32 contains a number of page table entries, wherein each page table entry contains an address location of a given page in memory. The ten page index bits of word 30 select a given page table entry within page table lists 32, wherein the selected page table entry selects a given page 33 in memory.

The 12 offset bits then select a given location within the selected page 33 in memory. Therefore, as used in the preferred embodiment, the offset bits always contain a portion of the final PA and it is only the most significant 20 bits which are used as a $VA_{tag}$ to generate the physical address. Further, it is to be appreciated that a plurality of page directory lists 31 can be utilized wherein a base register can then be utilized to point to the applicable directory listing.

It is to be noted that the address translation implemented in the preferred embodiment maps instruction VAs and data VAs into physical addresses before referencing memory. This address translation implements the basic features needed for page-oriented, virtual-memory systems having page-level protection. Further, as used in the preferred embodiment, a page 33 is a 4K-byte unit of contiguous address of physical main memory, such that the 12 offset bits address the contiguous 4K bytes of the page frame. Further, the page table list 32 and the page directory list 31 are also implemented in 4K byte frames.

Once the $PA_{tag}$ is generated from the page table list 32, the $PA_{tag}$ not only accesses the appropriate page 33 but the $PA_{tag}$ is combined with the $VA_{tag}$ of word 30 and both tags are stored in RAM of TLB 21. Thus, as implemented in the TLB 21 of the preferred embodiment, the most recently accessed $VA_{tag}$ and each of the corresponding $PA_{tag}$s are stored in TLB 21. Any subsequent access by a virtual address word having the same $VA_{tag}$ as one of the $VA_{tag}$s stored in TLB 21 will cause TLB 21 to generate the $PA_{tag}$ without requiring the longer address translation steps described in reference to FIG. 3.

Figure 4:
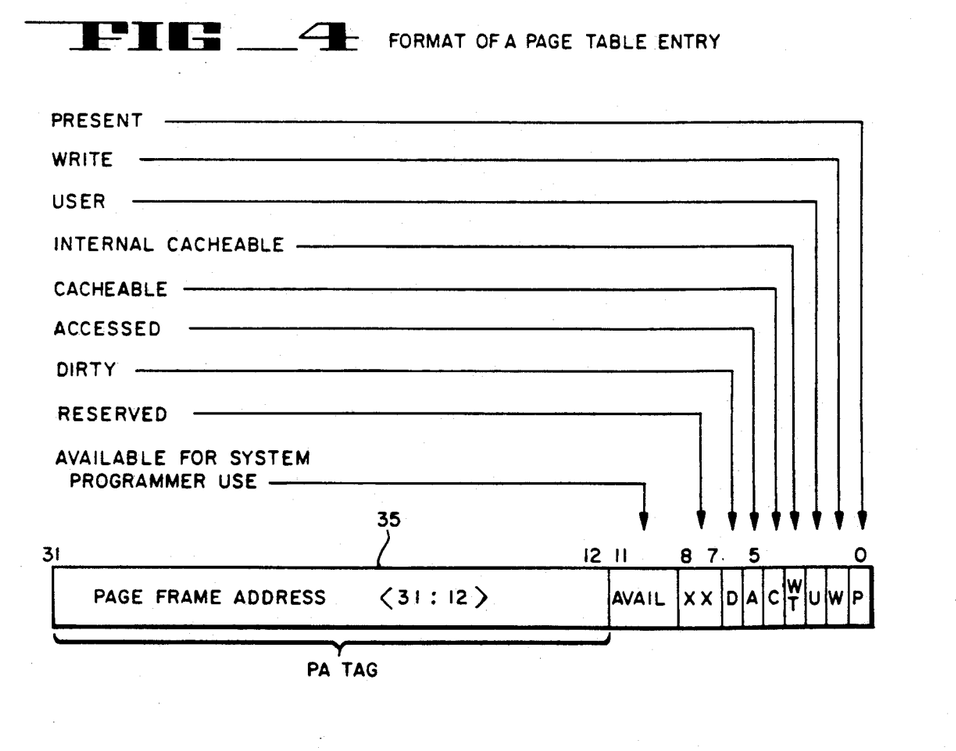
FIG. 4 is an illustration showing a format of a page table entry of the present invention.

Referring to FIG. 4, a format of a page table entry as used in the present invention is shown. Page table entry 35 is a 32-bit word, wherein the most significant 20 bits comprise the $PA_{tag}$ pointing to the address location of the selected page frame. Bits <31:12> of word 35 contains the 20 bit $PA_{tag}$. The least significant 12 bits are utilized to provide various other information, including access protection under various execution cycles. It is to be appreciated that the page table entry format is presented herein for exemplary purpose and is not for the purpose of limiting the invention. Various other schemes can be readily implemented for the page table entry of the present invention. Further, in the preferred embodiment, an equivalent format is also used for the directory entries within page directory list 31.

The present bit (P) indicates whether a page table entry can be used in address translation. A P value of one indicates that the entry can be used while a P value of zero signifies that the entry is not valid for address translation and a trap is generated. A trap being an interrupt for terminating the continuing operation of the current instruction and/or data execution cycle. The accessed (A) and the dirty (D) bits provide access information. The access bit is set to a value of one when a read or a write cycle to that page is issued by the CPU.

The dirty bit is used to indicate whether the data in a particular page has been modified. One use for a such dirty bit D is in permitting the processor to write to a page only when the dirty bit has been set, otherwise if the dirty bit is clear, a page fault is generated and a trap results. Two cacheable bits (C) and (WT) are utilized for placing data from the associated page into an instruction cache and a data cache of the microprocessor system with the purpose of controlling information being stored into the instruction and data caches.

A write bit (W) and a user bit (U) are used for providing page protection. For each read or write cycle these bits are tested. When the U bit has a value of one, it indicates a user mode, while a value of zero indicates a supervisory mode. The W bit indicates a write privilege. When the W bit equals a value of one the address location may be written into. As will be discussed later these bits are utilized to provide the access protection under varying conditions.

As will be noted from FIGS. 2, 3, and 4, the memory management unit of the present invention receives a 32 bit virtual address VA in which 20 of the most significant bits $<31:12>$ are used to provide the $VA_{tag}$. Ten of those 20 bits ($<31:22>$) are utilized to provide the directory index while the other ten bits ($<21:12>$) are used to provide the page index for virtual addressing. TLB 21 looks at the $VA_{tag}$ and compares the inputted $VA_{tag}$ to $VA_{tag}$s stored within TLB 21. If the comparison results in a miss, the inputted $VA_{tag}$ is passed through MUX 23 and the system subsequently performs an address translation according to FIG. 3 to arrive at a PA pertaining to a given page in memory. However, if the comparison results in a hit, the address translation will not be required because the actual physical address corresponding to the virtual address is already stored within TLB 21. Execution speed is improved because the page table listing of FIG. 3 need not be accessed to determine the $PA_{tag}$. The $PA_{tag}$ is provided by TLB 21 and when combined with the offset bits provides the actual physical address of the location being accessed in the main memory.

In the preferred embodiment, each page contains 4K bytes of memory and, therefore, $VA_{tag}$ is capable of accessing 4K byte locations. In the preferred embodiment TLB 21 is implemented with a four-way set associative cache with 16 sets per line for a total of 64 entries. The lines of each set are contained in the four RAM arrays of the TLB 21. The four least significant bits of the $VA_{tag}$ are used to select one of the 16 sets, and the sixteen most significant bits of the $VA_{tag}$ are used to compare the output of the four lines in the set. Thus, four comparisons are achieved simultaneously in TLB 21. A variety of other techniques can be readily implemented to perform the storage and comparison of TLB 21. Further, it is to be appreciated that although 12 offset bits are shown in the drawings, the actual number of bits utilized to access the physical address within a given page 33 is a design choice. As stated earlier, the four RAM arrays of TLB 21 functions as a cache memory in storing $VA_{tag}$s and associated $PA_{tag}$s, as well as the status bits, of the most recently used pages.

As will be noted in the page table entry format, word 35 not only includes the $PA_{tag}$, but includes various status bits. The status bits are utilized for providing status and access protection. When TLB 21 stores a given $VA_{tag}$ and a $PA_{tag}$, a number of these status bits are also appended to the $PA_{tag}$, such that when the $PA_{tag}$ is provided by TLB 21 to MUX 23, various status bits are also provided for determining access control.

Figure 5:
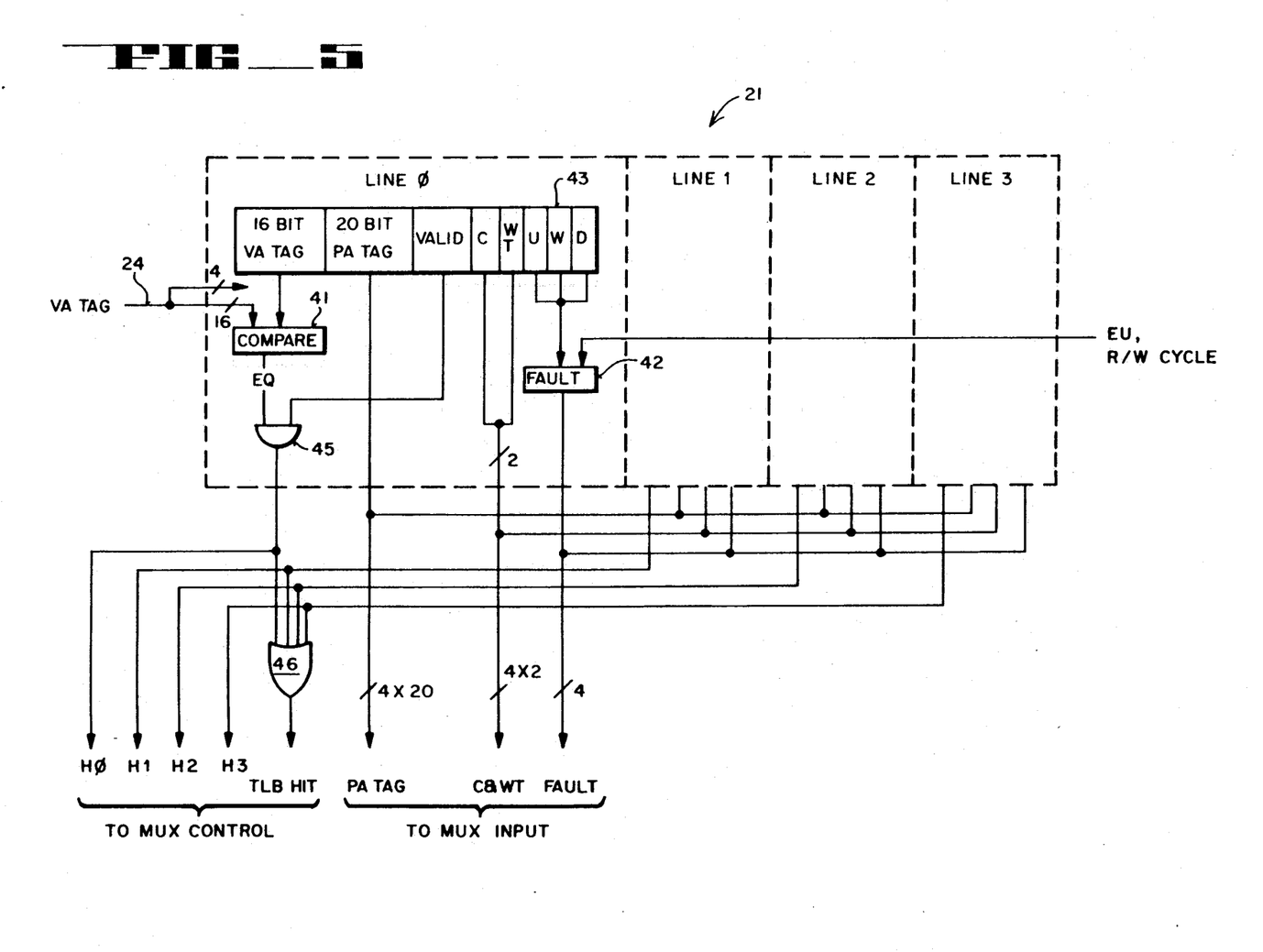
FIG. 5 is a block schematic diagram of the translation look-aside buffer of the preferred embodiment.

Referring to FIG. 5, a circuit block diagram of TLB 21 as implemented in the preferred embodiment is shown. As stated, TLB 21 is implemented with a four-way (line 0-3) set associative cache with 16 sets for a total of 64 entries. It is to be appreciated that the actual configuration of the cache memory of TLB 21 is a design choice and a variety of other well-known memory configurations can be implemented in place of the set associative cache of the preferred embodiment. The lines of each set are contained in four RAM arrays each with its own fault detection and cache hit logic. The following description is provided in reference to line 0, but it is to be noted that equivalent circuitry is repeated in the other lines 1-3.

The cache hit logic is provided by comparator 41 and the fault detection is provided by a fault detection circuit 42. Only a single entry 43 is shown in line zero of FIG. 5 for exemplary purpose only. Within entry 43, a 16-bit $VA_{tag}$, a 20 bit $PA_{tag}$ and a number of status bits, namely, Valid, C, WT, D, U, and W are stored. TLB 21 accepts the 20 MSBs of the virtual address on line 24. The four least significant bits of the 20 bit $VA_{tag}$ are used to select one of the sets of each line and the other 16 most significant bits are then sent to comparator 41 of each line.

Comparator 41 then compares the 16 MSBs of the inputted $VA_{tag}$ to the stored $VA_{tag}$ of entry 43. When a comparison results in a hit, a signal is generated from comparator 41 as an input to AND gate 45. AND gate 45 also receives an indication from the valid bit indicating that the information is valid (useable and not stale). Presuming that the indications result in a hit (tag match) and that the information is valid, AND gate 45 generates a hit signal. If the match occurs in reference to line 0, then the hit indication H0 is provided.

Respectively, a hit on each of the lines 1, 2, and 3 is provided as H1, H2 and H3. Hits in more than one line for a given $VA_{tag}$ in not permitted. Hit lines H0–H3 are ORed together through an OR gate 46 which output provides the TLB HIT signal indicating a hit in the TLB 21. Each of the hit signals H0–H3 and the TLB HIT signal correspond to the five control signals for controlling MUX 23, as shown in FIG. 2. It is to be stressed that only one of the lines 0-3 can have the correct $VA_{tag}$ so that only one of the H0–H3 lines will indicate a hit condition. Each of the entries 43 of lines 0–3 generates a 20-bit $PA_{tag}$, such that four 20-bit $PA_{tag}$s are provided as inputs to MUX 23. The correct $PA_{tag}$ is selected by MUX 23 since the appropriate hit signal H0–H3 will control the correct $PA_{tag}$ to be passed through MUX 23.

At the same time the $PA_{tag}$ is being provided from TLB 21, the corresponding status bits are also provided as an output from TLB 21. The C and WT bits are appended to the $PA_{tag}$ such that the C and WT tag corresponding to the selected $PA_{tag}$ is passed through MUX 23. The D, U and W bits are coupled to a fault detection circuit 42 for determining if a fault indication is warranted. Fault detection circuit 42 of each line 0-3 provides an output which is also appended to the appropriate $PA_{tag}$ corresponding to respective lines 0-3. Also coupled to each fault detection circuit 42 is the EU signal and the read-write (R/W) signal. The EU signal indicates if it is a user or a supervisory request and the R/W signal indicates if it is a read or a write cycle. The fault detection circuit 42 is utilized to determine if the selected $PA_{tag}$ is to be used to access the physical location. If a no-fault condition exists, then the $PA_{tag}$ is combined with the offset bits to access the physical location in memory. However, if a fault indication is present for the appropriate line number selected, then a trap is generated, preventing the physical location from being accessed.

Each fault detection circuit 42 checks the U, W, and D status bits and compares these bits to execution cycle signals EU and R/W. A variety of fault detection logic can be implemented within fault detection circuit 42, however, the fault detection circuit 42 used in the preferred embodiment is shown in FIG. 6.

Figure 6:
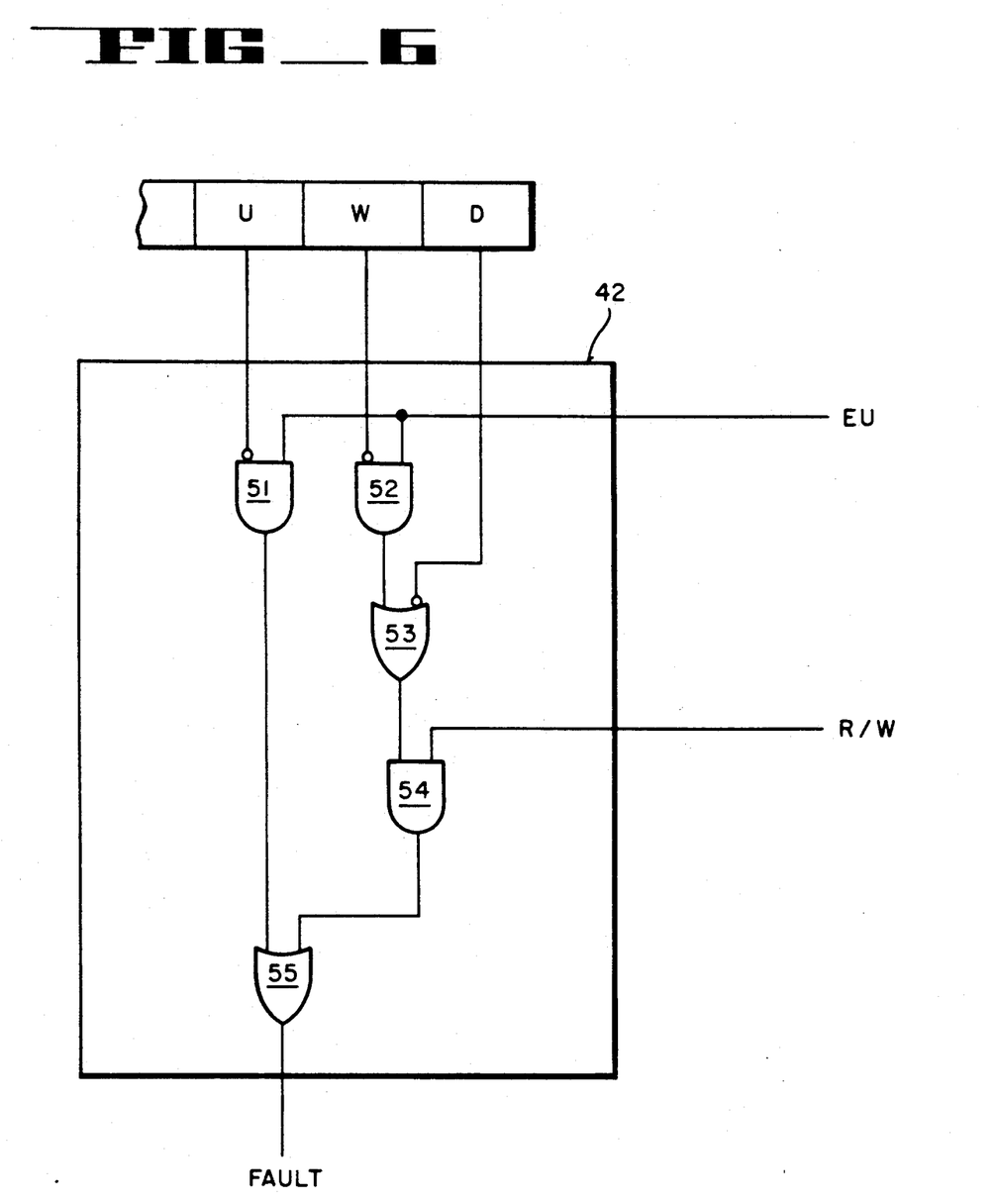
FIG. 6 is a circuit schematic diagram of a fault detection logic circuit of the preferred embodiment.

Also referring to FIG. 6, the U bit is coupled to an AND gate 51 having an inverted input while the W bit is coupled to an AND gate 52 having an inverted input. A second input to each of the AND gates 51 and 52 is provided by the signal EU. The output of AND gate 51 is coupled to one input of OR gate 55. The output of AND gate 52 is coupled as an input to an OR gate 53. The D bit is coupled as a second input to OR gate 50 through an inverter and the output of OR gate 53 is coupled as an input to an AND gate 54. The R/W signal is coupled as a second input to AND gate 54. The output of AND gate 54 is coupled as a second input to OR gate 55, wherein the output of OR gate 55 provides the output of the fault detection circuit 42.

Thus, as practiced in the preferred embodiment, the fault detection logic checks the U, W and D bits of each line. If the processor is in user mode (signal EU is asserted) and if the U bit is not set, a user access violation occurs. If the processor is in user mode and the cycle type is a write cycle and the W bit is not set, then a write protection violation occurs. If the cycle type is a write cycle, and the dirty bit is not set, then a violation occurs. It is to be noted that one fault signal is generated for all types of violation to generate the trap. Further, it is to be appreciated that a variety of other fault detection logic can be readily implemented for circuit 42. Accordingly, other status bits can be readily inputted to the fault detection circuit 42 to provide various other fault detection logic schemes. Each of the fault signals is appended to the respective $PA_{tag}$ for passage through MUX 23 when selected.

The advantage of the fault detection scheme of the present invention is that the system checks for all fault conditions simultaneously in parallel with the process of comparing the $VA_{tag}s$. That is, unlike the prior art where the access check is provided in a sequential fashion with the generation of the physical address tag, the present invention checks for the fault condition at the same time the physical address tags are generated. Because the two operations are provided in parallel, significant time savings is achieved. Additionally, it is to be noted that because of the combinatorial logic of the fault detection circuit 42, the physical address generation and the fault protection checking is achieved simultaneously in one clock cycle (or one phase of a multiple-phase clock cycle), thus providing a significant speed improvement over the prior art. Consequently, the fault signals, if any, indicating that some form of access or control violation has occurred, is available when the physical address is provided as the output of the TLB 21 and select MUX 23.

MUX 23 of FIG. 2 is a TLB line selection MUX having a 5 to 1 multiplexing capability to select the signal which is to be driven. The four $PA_{tag}s$ of the selected set and the appropriate C and WT bits and the fault signal associated with each line 0-3 are provided as inputs to MUX 23. The individual hit signals H0-H3 will select the appropriate $PA_{tag}$ and the corresponding status bits, and fault signal. If none of the individual signals H0-H3 are asserted, then the TLB HIT signal will remain low causing MUX 23 to select the $VA_{tag}$ (or alternatively select the $PA_{tag}$ from translator 25 if the alternative scheme is used) to be passed through. Because TLB 21 is utilized as a cache memory, the $VA_{tag}$ causing a miss will then be inputted into TLB 21 during a subsequent cycle with appropriate $PA_{tag}$ and status bits. Accordingly, the system of the present invention is able to keep up with very high speeds necessary to implement high speed execution of current and future microprocessors, especially those microprocessors implemented on a single integrated circuit chip.

Although the invention has been described with reference to a particular arrangement and system, it will be apparent to those skilled in the art that the details of those arrangements and systems are used for illustrative purposes only and should not be taken as limitations to the present invention. Thus a parallel fault detection scheme is provided for an address translation look-aside buffer.

We claim:

1. A virtual memory management system for a processor for providing an output physical address to access a physical location in response to an input virtual address comprising:

a single associative memory means for storing multiple virtual addresses, an equal multiple of respectively corresponding physical addresses, and an equal multiple of respectively corresponding sets of status bits; each set of status bits indicating access right of its corresponding physical address to a specific physical location, each set of status bits containing at least one status bit;

comparator means coupled to receive said input virtual address and also coupled to receive said multiple virtual addresses for comparing said input virtual address with said multiple virtual addresses to determine if a matching multiple virtual address exists among those addresses compared;

fault detection circuit means coupled to said memory means for receiving said sets of status bits corresponding to said physical addresses and determining if a current access request of each of said physical addresses is permitted by its set of status bits, said fault detection circuit means performing its access check simultaneously with said comparing of said input virtual address with said multiple virtual addresses and generating a fault indication signal for each of said physical addresses, which fault indication signal is of the type that prohibits access of said specific physical location if said set of status bits indicates that said current access request is prohibited; and selector means coupled to said memory means, comparator means and fault detection circuit means for selecting a physical address corresponding to said matching multiple virtual address as said output physical address and its corresponding fault indication signal as an output fault indication signal if a match results in said comparator, in order to access said physical location if said output fault indication signal permits said access, such that the fault indication signal and the physical address are provided in a single clock cycle.

2. The virtual memory management system of claim 1 wherein said memory means is a cache memory.

3. A virtual memory management system of claim 1 wherein said memory means is a four-way set associative cache memory.

4. The virtual memory management system of claim 1 wherein said memory is a four-way set associative cache memory implemented in four random access memory arrays.

5. A virtual memory management system for a processor for providing a portion of an output physical address (output physical address tag) to access a physical location in response to an input virtual address comprising:

a single associative memory means for storing multiple virtual addresses, an equal multiple of respectively corresponding physical address tags, and an equal multiple of respectively corresponding sets of status bits; each set of status bits indicating access right of its corresponding physical address to a specific physical location, each set of status bit containing at least one status bit;

comparator means coupled to receive said input virtual address and also coupled to receive said multiple virtual addresses for comparing said input virtual address with said multiple virtual addresses to determine if a matching multiple virtual address exists among those addresses compared;

fault detection circuit means coupled to said memory means for receiving said sets of status bits corresponding to said physical address tags and determining if a current access request of each of said physical address tags is permitted by its set of status bits, said fault detection circuit means performing its access check simultaneously with said comparing of said input virtual address with said multiple virtual addresses and generating a fault indication signal for each of said physical address tags which fault indication signal is of the type that prohibits access of said specific physical location if said set of status bits indicates that said current access request is prohibited; and selector means coupled to said memory means, comparator means and fault detection circuit means for selecting a physical address tag corresponding to said matching multiple virtual address as said output physical address tag and its corresponding fault indication signal as an output fault indication signal to access said physical location, only if said comparator means find said matching multiple virtual address and said fault detection circuit permits said requested access, such that the fault indication signal and the physical address are provided in a single clock cycle.

6. The virtual memory management system of claim 5 wherein said memory means is a cache memory.

7. The virtual memory management system of claim 5 wherein said memory means is a four-way set associative cache memory for storing four selected virtual addresses and corresponding physical addresses and status bits.

8. The virtual memory management system of claim 5 wherein said memory is a four-way set associative cache memory implemented in four random access memory arrays.

9. A virtual memory management system for a processor for providing an output physical address tag to access a physical location in response to an input virtual address comprising:

a single associative buffer memory for storing multiple virtual address tags, an equal multiple of respectively corresponding physical address tags, and an equal multiple of respectively corresponding sets of status bits; each set of status bits indicating access right of its corresponding physical address to a specific physical location, each set of status bits containing at least one status bit;

a comparator coupled to receive a virtual address tag of said input virtual address and also coupled to receive said multiple virtual address tags for comparing said multiple virtual address tags with said virtual address tag of said input virtual address to determine if a matching multiple virtual address tag exists among those address tags compared;

a fault detection circuit coupled to said buffer memory for receiving said sets of status bits corresponding to said physical address tags and determining if a current access request of each of said physical address tags is permitted by its set of status bits, said fault detection circuit performing its access check simultaneously with said comparing of said multiple virtual address tags with said virtual address tag of said input virtual address and generating a fault indication signal for each of said physical address tags, which fault indication signal is of the type that prohibits access of said specific physical location if said set of status bits indicates that said current access request is prohibited; and a multiplexer coupled to said buffer memory, comparator and fault detection circuit for selecting a physical address tag corresponding to said matching multiple virtual address tag as said output physical address tag and its corresponding fault indication signal as an output fault indication signal to access said physical location, only if said comparator finds a matching multiple virtual address tag and said fault detection circuit permits said requested access, such that the fault indication signal and the physical address are provided in a single clock cycle.

10. The virtual memory management system of claim 9 wherein said fault detection circuit comprises a plurality of said fault detection circuit means, one of said fault detection circuits for each physical address tag stored.

11. The virtual memory management system of claim 10 wherein said buffer memory is a cache memory.

12. The virtual memory management system of claim 10 wherein said buffer memory is a four-way set associative cache memory for storing four selected virtual address tags and corresponding physical address tags and status bits.

13. The virtual memory management system of claim 10 wherein said buffer memory is a four-way set associative cache memory having four random access memory arrays.

14. In a virtual memory system for a computer including a single physical memory, means for storing information in said physical memory, means for providing virtual addresses representing locations in said physical memory at which information is stored, and means for translating said virtual addresses to physical addresses for accessing locations in said physical memory, the improvement comprising a buffer memory containing a plurality of stored virtual addresses and corresponding physical addresses utilized by said computer, means for addressing said buffer memory by an input virtual address, means for comparing said input virtual address to said stored virtual addresses, means for selecting a physical address from said buffer memory if said input virtual address matches one of said stored virtual addresses, and means for determining if access to said physical address is permitted at the same time as said input virtual address is compared to said stored virtual addresses, such that the access to the physical address and the physical address are provided in a single clock cycle.

15. The virtual memory system of claim 14 wherein said buffer memory is a cache memory.

16. The virtual memory system of claim 15 wherein said indication of said access violation is determined by a mode of operation being performed by said computer.

17. In a method of operating a virtual memory system for a computer including a single physical memory, means for storing information in said physical memory, means for providing virtual addresses representing locations in said physical memory at which information is stored, and means for translating said virtual addresses to physical addresses for accessing locations in said physical memory at which information is stored, the improvement comprising the steps of:

storing a plurality of virtual addresses and corresponding physical addresses in a buffer for use by said computer;

addressing said buffer memory by an input virtual address;

comparing said input virtual address to said plurality of virtual addresses;

selecting from said buffer memory a physical address corresponding to one of said plurality of virtual addresses if said input virtual address matches said one of said plurality of virtual addresses; and determining if access to said physical address is permitted at the same time as said input virtual address is compared to said stored virtual addresses, such that the access to the physical address and the physical address are provided in a single clock cycle.

* * * * *